United States Patent

Schmidhalter et al.

Patent Number: 5,871,882
Date of Patent: Feb. 16, 1999

[54] HIGH CAPACITY RECORDING MEDIA

[75] Inventors: Beat Schmidhalter, Giffers; Heinz Wolleb, Marly; Marcus Baumann, Basel, all of Switzerland

[73] Assignee: Ciba Specialty Chemicals Corporation, Tarrytown, N.Y.

[21] Appl. No.: 890,163

[22] Filed: Jul. 9, 1997

[30] Foreign Application Priority Data

Jul. 12, 1996 [CH]  Switzerland .......................... 1756/96

[51] Int. Cl.$^6$ ...................................... G11B 7/24
[52] U.S. Cl. .................. 430/270.16; 430/945; 369/288; 428/64.8; 540/145
[58] Field of Search ...................... 540/145; 430/270.16, 430/945; 369/284, 288; 428/64.8, 64.9, 912, 913

[56] References Cited

U.S. PATENT DOCUMENTS

| | | | |
|---|---|---|---|
| 4,814,256 | 3/1989 | Aldag et al. | 430/270 |
| 4,906,498 | 3/1990 | Ichikawa et al. | 430/945 |
| 4,908,442 | 3/1990 | Narang et al. | 540/145 |
| 4,939,011 | 7/1990 | Takahashi et al. | 430/945 |
| 4,990,388 | 2/1991 | Hamada et al. | 430/270.2 |
| 5,064,952 | 11/1991 | Chang et al. | 540/145 |
| 5,486,437 | 1/1996 | Iwamura et al. | 430/270.16 |

FOREIGN PATENT DOCUMENTS

| | | |
|---|---|---|
| 0252360 | 1/1988 | European Pat. Off. |
| 1174488 | 7/1989 | Japan . |
| 7276804 | 10/1995 | Japan . |

OTHER PUBLICATIONS

Derwent Abstr. 90–078110/11 for JP 02–029385.
Derwent Abstr. 90–331489/44 for JP 02–238061.
Derwent Abstr. 91–203666/28 for JP 03–127791.
Derwent Abstr. 92–180900/22 for JP 04–120085.
Derwent Abstr. 93–299372/38 for JP 05–212968.
Chem. Abst. 124: 189619b for JP 07–276804.
Derwent Abst. 96–035685/04 for JP 7–304256.
Derwent Abst. 96–035686/04 for JP 7–304257.
Anal. Chem. (1995), 67, 4112–4117.
Derwent Abstr. 89–358291/49 (for EP 344891 and Equivalency List for EP344891).
Derwent Abstr. 89/238885/33 for JP 01–174488.
Inorganica Chimica Acta, 182, (1991) pp. 83–86.
Patent Abstracts of Japan Publication No. 02029385.
Patent Abstracts of Japan Publication No. 58197088.
Patent Abstracts of Japan Publication No. 07304257.

*Primary Examiner*—Martin Angebranndt
*Attorney, Agent, or Firm*—Kevin T. Mansfield; Jacob M. Levine

[57] ABSTRACT

An optical recording medium comprising a substrate, a reflecting layer and a recording layer, which recording layer consists essentially of one or more than one dye of formula (I) or chlorination or bromation products thereof

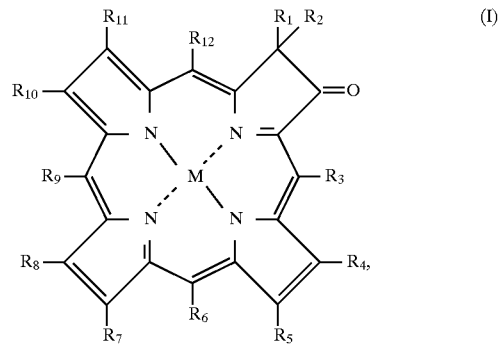

wherein $R_1$ and $R_2$ are each independently of the other $C_1$–$C_8$alkyl or $C_2$–$C_8$alkenyl;

$R_3$, $R_6$, $R_9$ and $R_{12}$ are hydrogen, halogen, CN, CHO, $C_1$–$C_8$alkyl or unsubstituted or substituted $C_6$–$C_{14}$aryl;

$R_4$, $R_5$, $R_7$, $R_8$, $R_{10}$ and $R_{11}$ are hydrogen, halogen, $NO_2$, CHO, $COOR_{13}$, $CONR_{14}R_{15}$, CN or unsubstituted or substituted $C_1$–$C_8$alkyl or $C_2$–$C_8$alkenyl;

or $R_4$ and $R_5$, $R_7$ and $R_8$ and/or $R_{10}$ and $R_{11}$ together are an unsubstituted or substituted 1,4-buta-1,3-dienylene, 2-buten-1,4-diylidene, 1,3-propylene or 1,4-butylene bridge, so as to form, optionally together with the shared C—C or C═C group, a five- or six-membered ring;

and M is $H_2$ or a divalent metal atom, oxometal, halogenometal or hydroxymetal which may be coordinated to one or two neutral ligands.

The recording media of this invention have high sensitivity and resolution as well as good reproduction characteristics.

18 Claims, No Drawings

HIGH CAPACITY RECORDING MEDIA

The field of the present invention is the optical recording of information on write-once recording media, where the bits of information are differentiated by the different optical properties of a colorant at written and unwritten sites. This technology is referred to commonly as WORM (for example CD-R or DVD-R); these abbreviations have been adopted here as well.

Compact discs which can be written at a wavelength from 770 to 830 nm are known from "Optical Data Storage 1989", Technical Digest Series, Vol.1, 45 (1989). They are read at a reduced readout rate. According to the Orange Book standard, the medium must have a base reflectivity of 65% or more at the recording wavelength. Examples of recording media that can be used are cyanine dyes (JP 58/125 246), phthalocyanines (EP 676 751, EP 712 904), azo dyes (U.S. Pat. No. 5,441,844), double salts (U.S. Pat. No. 4,626,496), dithioethene metal complexes (JP 63/288 785, JP 63/288 786), azo metal complexes (U.S. Pat. No. 5 272 047, U.S. Pat. No. 5,294,471, EP 649 133, EP 649 880) or mixtures thereof (EP 649 884).

As a result of the use of more recent compact powerful red diode lasers which emit in the range from 630 to 690 nm, it is possible in principle to improve the data packing density from 5 to 8 times, since the track spacing (distance between 2 turns of the information track) and the size of the bits can be reduced, for instance, to about half those of a conventional CD.

However, this places extremely stringent requirements on the recording layer to be used, such as high refractive index, optimal position of the absorption bands and, in particular, high daylight stability coupled with high sensitivity to high-energy laser radiation. The known recording layers possess these properties only to an unsatisfactory extent.

Thus EP 676 751, JP 04/120 085 and JP 05/212 968 describe optical recording media which consist of a polymer matrix and, incorporated therein, metal-free porphyrins which are substituted by four aryl groups.

EP 344 891 and JP 07/276 804 describe optical recording media which can be written on at 630 to 700 nm and wherein the recording layer comprises specific teraazaporphyrins containing fused N-containing hetero aromatic rings.

JP 02/238 061 describes green tetraaryl-substituted Au, Sn or Pd metal complexes of porphyrin derivatives, the double bond system of which is interrupted by an $sp^3$-hybridised carbon atom. These compounds can be used for a variety of purposes, apparently also for optical recording media.

JP 02/029 385 describes Cu, Ni, Pt, Pd, In, VO or Ti metal complexes of oxo-polysubstituted secoporphyrins which are said to have high heat stability in optical recording media.

Furthermore, JP 07/304 256 and JP 07/304 257 describe optical recording media which consist of a polymer matrix and porphyrin metal complexes incorporated therein, typically Zn complexes. The information is recorded in the wavelength range from 400 to 500 nm, and sensitivity and colour density are said to be high.

Lastly, JP 01/174 488 describes an optical recording medium which comprises biologically occurring porphyrin metal complexes, such as chlorophyll, cytochromes or haem. It is possible, for example, to record optical information on a chlorophyll layer with a He-Ne laser having an intensity of 18–19 mW at 633 nm. However, this recording medium is unsatisfactory with respect to its sensitivity and its dye layer which is too thick. In addition, writing on these biologically occurring porphyrin metal complexes must be carried out at a wavelength at about the absorption maximum, and the solid properties thereof are not sufficiently satisfactory.

The aim of the invention was to provide an optical recording medium whose recording layer possesses high storage capacity coupled with outstanding properties otherwise. This recording medium should be both writeable and readable at wavelengths in the region from 400 to 700 mn, in particular in the region from 600 to 700 nm. Principal features of the novel recording layer are the very high initial reflectivity in the above-mentioned wavelength region of the laser diodes, which reflectivity can be altered with high sensitivity, the high refractive index, the excellent purity, and the narrow absorption band in the solid state, the good uniformity of the written width at different pulse durations, as well as the excellent light stability and good solubility in polar solvents.

The use of specific oxoporphyrin metal complexes as recording layer has very surprisingly made it possible to provide an optical recording medium whose properties are astonishingly better than those of recording media known to date.

The invention accordingly provides an optical recording medium comprising a substrate, a reflecting layer and a recording layer, which recording layer consists essentially of one or more than one dye of formula (I) or chlorination or bromation products thereof

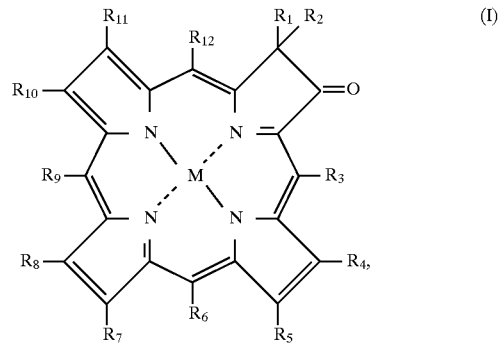

(I)

wherein $R_1$ and $R_2$ are each independently of the other $C_1$–$C_8$alkyl or $C_2$–$C_8$alkenyl, each of which is unsubstituted or substituted by $OR_{13}$, $NR_{14}R_{15}$, $COOR_{13}$, $CONR_{14}R_{15}$ or CN;

$R_3$, $R_6$, $R_9$ and $R_{12}$ are each independently of one another hydrogen, halogen, CN, CHO, $C_1$–$C_8$alkyl, or $C_6$–$C_{14}$aryl which is unsubstituted or mono- or polysubstituted by halogen, $NO_2$, $C_1$–$C_8$alkyl, $OR_{13}$, $SR_{13}$, $NR_{14}R_{15}$, $COOR_{13}$, $CONR_{14}R_{15}$ or CN;

$R_4$, $R_5$, $R_7$, $R_8$, $R_{10}$ and $R_{11}$ are each independently of one another hydrogen, halogen, $NO_2$, CHO, $COOR_{13}$, $CONR_{14}R_{15}$, CN, or $C_1$–$C_8$alkyl or $C_2$–$C_8$alkenyl, each of which is unsubstituted or substituted by $OR_{13}$, $NR_{14}R_{15}$, $COOR_{13}$, $CONR_{14}R_{15}$ or CN, or wherein, each independently of one another, one or several pairs $R_4$ and $R_5$, $R_7$ and $R_8$ and/or $R_{10}$ and $R_{11}$ are 1,4-buta-1,3-dienylene which is unsubstituted or mono- or polysubstituted by halogen, $NO_2$, $C_1$–$C_8$alkyl, $OR_{13}$, $SR_{13}$, $NR_{14}R_{15}$, $COOR_{13}$, $CONR_{14}R_{15}$ or CN, or 1,3-propylene, 1,4-butylene or 2-buten-1,4-ylene, each of which is unsubstituted or mono- or polysubstituted by $C_1$–$C_8$alkyl, $OR_{13}$, $NR_{14}R_{15}$, $COOR_{13}$, $CONR_{14}R_{15}$ or CN, such that, optionally together with the shared C—C or C=C group, a five- or six-membered ring is formed;

wherein $R_{13}$, $R_{14}$ and $R_{15}$ are each independently of one another hydrogen, $C_1$–$C_{20}$alkyl, $C_2$–$C_{20}$alkenyl, $C_2$–$C_{20}$alkynyl, $C_6$–$C_{14}$aryl or $C_7$–$C_{18}$aralkyl, or $NR_{14}R_{15}$ is a five- or six-membered heterocycle which may contain a further N or O atom and which can be mono- or polysubstituted by $C_1$–$C_8$alkyl;

and M is $H_2$ or a divalent metal atom, oxometal, halogenometal or hydroxymetal, and wherein the divalent oxometal, halogenometal or hydroxymetal may be additionally coordinated to one, and the divalent metal atom may additionally be coordinated to one or two, neutral molecules which are independent or dependent on each other and which contain at least one hetero atom selected from the group consisting of N, O and S.

Alkyl, alkenyl or alkynyl, e.g. $C_1$–$C_{20}$alkyl, $C_2$–$C_{20}$alkenyl or $C_2$–$C_{20}$alkynyl, can be straight-chain, branched, monocyclic or polycyclic. Accordingly, $C_1$–$C_6$alkyl is typically methyl, ethyl, n-propyl, isopropyl, n-butyl, sec-butyl, isobutyl, tert-butyl, cyclobutyl, n-pentyl, 2-pentyl, 3-pentyl, 2,2-dimethylpropyl, cyclopentyl, n-hexyl, cyclohexyl and, in addition, $C_1$–$C_{20}$alkyl is typically n-octyl, 1,1,3,3-tetramethylbutyl, 2-ethylhexyl, nonyl, trimethylcyclohexyl, decyl, menthyl, thujyl, bornyl, 1-adamantyl, 2-adamantyl, dodecyl, tetradecyl, hexadecyl, octadecyl or eicosyl.

$C_2$–$C_{20}$Alkenyl is mono- or polyunsaturated $C_2$–$C_{20}$alkyl, wherein two or more double bonds may be isolated or conjugated, typically vinyl, allyl, 2-propen-2-yl, 2-buten-1-yl, 3-buten-1-yl, 1,3-butadien-2-yl, 2-cyclobuten-1-yl, 2-penten-1-yl, 3-penten-2-yl, 2-methyl-1-buten-3-ly, 2-methyl-3-buten-2-yl, 3-methyl-2-buten-1-yl, 1,4-pentadien-3-yl, 2-cyclopenten-1-yl, 2-cyclohexen-1-yl, 3-cyclohexen-1-yl, 2,4-cyclohexadien-1-yl, 1-p-menthen-8-yl, 4(10)-thujen-10-yl, 2-norbornen-1-yl, 2,5-norbornadien-1-yl, 7,7-dimethyl-2,4-norcaradien-3-yl or the different isomers of hexenyl, octenyl, nonenyl, decenyl, dodecenyl, tetradecenyl, hexadecenyl, octadecenyl, eicosenyl, heneicosenyl, docosenyl, tetracosenyl, hexadienyl, octadienyl, nonadienyl, decadienyl, dodecadienyl, tetradecadienyl, hexadecadienyl, octadecadienyl or eicosadienyl.

$C_2$–$C_{20}$Alkynyl is $C_2$–$C_{20}$alkyl or $C_2$–$C_{20}$alkenyl which is doubly mono- or polyunsaturated and wherein the triple bonds may be isolated or may be conjugated with each other or with double bonds, typically 1-propyn-3-yl, 1-butyn-4-yl, 1-pentyn-5-yl, 2-methyl-3-butyn-2-yl 1,4-pentadiin-3-yl, 1,3-pentadiin-5-yl, 1-hexyn-6-yl, cis-3-methyl-2-penten-4-yn-1-yl, trans-3-methyl-2-penten-4-yn-1-yl, 1,3-hexadiin-5-yl, 1-octyn-8-yl, 1-nonyn-9-yl, 1-dec-10-yl or 1-tetracosyn-24-yl.

$C_7$–$C_{18}$Aralkyl is typically benzyl, 2-benzyl-2-propyl, β-phenylethyl, 9-fluorenyl, α,α-dimethyl-benzyl, ω-phenylbutyl, ω-phenyloctyl, ω-phenyidodecyl or 3-methyl-5-(1',1',3',3'-tetramethyl)-butylbenzyl. In addition, $C_7$–$C_{24}$aralkyl can typically also be 2,4,6-tri-tert-butylbenzyl or 1-(3,5-dibenzylphenyl)-3-methyl-2-propyl. If $C^7$–$C_{18}$aralkyl is substituted, then the alkyl as well as the aryl moiety of the aralkyl group may be substituted, the latter alternative being preferred. $C_6$–$C_{18}$Aryl is typically phenyl, naphthyl, biphenylyl, 2-fluorenyl, phenanthryl, anthracenyl or terphenylyl.

Divalent metal atoms are typically Cu(II), Zn(II), Fe(II), Ni(II), Ru(II), Rh(II), Pd(II), Pt(II), Mn(II), Mg(II), Be(II), Ca(II), Ba(II), Cd(II), Hg(II), Sn(II), Co(II) or Pb(II). Divalent oxometals are typically V(IV)O, Mn(fV)O or Ti(IV)O. A typical example of a divalent halogenometal is Fe(III)Cl. A typical example of a divalent hydroxymetal is Al(III)OH.

Coordinated neutral molecules may be customary ligands suitable for transition metals, for example water, amines, ammonia, hydrazine, triethylamine, carbon monoxide, nitrogen monoxide, acetone or heteroaromatic compounds, such as pyridine, quinoline, furan, pyrrole, thiophene or methylimidazole.

Halogen is chloro, bromo, fluoro or iodo, preferably chloro or bromo.

Chlorination and bromation products of dyes of formula (I) are understood to be the reaction products of dyes of formula (I) with customary chlorinating and bromating agents. Customary chlorinating and bromating agents are, for example, chloro, bromo, hypochlorides and hypobromides, N-chloro- and N-bromosuccinimide, phosphorus pentachloride as well as 1,3-dibromo-5,5-dimethylhydantoin. The chlorination or bromation conditions convenient for all customary chlorinating and bromating agents, as well as optional suitable catalysts, are also well known.

The exact structure of the chlorination and bromation products of dyes of formula (I) is not yet known with any certainty. Based on the available data it is assumed that they are not substitution but addition products of chlorine or bromine to the structure of formula (I).

$R_1$ and $R_2$ are preferably each independently of the other $C_1$–$C_8$alkyl which is unsubstituted or substituted by $COOR_{13}$, $CONR_{14}R_{15}$ or CN.

$R_3$, $R_6$, $R_9$ and $R_{12}$ are preferably each independently of one another hydrogen, halogen, CN, CHO, $C_1$–$C_8$alkyl, or phenyl which is unsubstituted or substituted by halogen, $NO_2$, $C_1$–$C_8$alkyl, $OR_{13}$, $SR_{13}$ or $COOR_{13}$.

$R_4$, $R_5$, $R_7$, $R_8$, $R_{10}$ and $R_{11}$ are preferably each independently of one another hydrogen or $C_1$–$C_8$alkyl.

The divalent metal atom, oxometal, halogenometal or hydroxymetal is preferably not co-ordinated to any additional neutral molecule. M is preferably $H_2$, Cu(II), Zn(II), Ni(II), Pd(II), Pt(II), Mn(II) or Co(II).

If the compound of formula (I) is replaced with a chlorinated or bromated compound of formula (I), said compound may conveniently contain at most 8, preferably at most 4 chlorine or bromine atoms.

Particularly preferred compounds are those of formula (I), wherein $R_1$ and $R_2$ are each independently of the other methyl or ethyl; $R_3$, $R_6$, $R_9$ and $R_{12}$ are hydrogen; $R_4$, $R_5$, $R_7$, $R_8$, $R_{10}$ and $R_{11}$ are each independently of one another straight-chain $C_1$–$C_6$alkyl which is unsubstituted or substituted in ω-position by COOH or $COOC_1$–$C_{20}$alkyl, in particular $(CH_2)_2COOC_1$–$C_{20}$alkyl, and M is $H_2$, Pt or Pd.

Very particularly preferred compounds are those of formula (II),

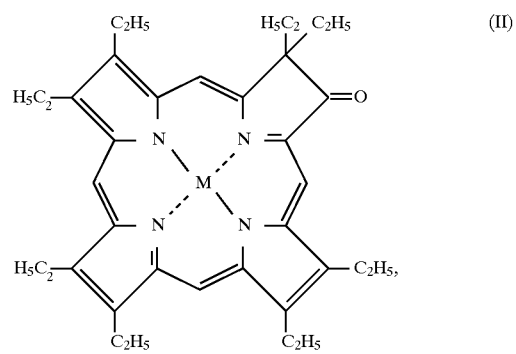

wherein M is as defined for formula (I), as well as the bromation products thereof which contain two or four bromine atoms.

The compounds of formulae (I) and (II) are known compounds which are used mainly in sensing, as is described, inter alia, in Anal. Chem. 67, 4112 (1995). Should some of them still be novel, they can be prepared in general analogy to the known compounds by methods known per se, e.g. by those methods which are disclosed in J. Heterocyclic Chem. 22, 1739 (1985), J. Org. Chem. 57, 4820 (1992), Photochemistry and Photobiology 55, 133 (1992), Inorg. Chem. 34, 1333 (1995) or in any other of the numerous publications known to the person skilled in this field. Entirely surprisingly, these compounds have a particularly advantageous narrow absorption curve in the solid state.

The oxoporphyrin dyes used according to this invention have, on the longer-wave flank of the absorption band, a high refractive index which preferably reaches a peak value of more than 1.8 in the range from 400 to 500 nm and from 600 to 700 nm, leading thus to the possibility of a medium having high reflectivity and high sensitivity with good reproduction characteristics in the desired spectral region. Moreover, it is unnecessary to add a further dye to the recording layer, with the result that very good light fastness is obtained.

The substrate functioning as a support for the layers applied to it is conveniently semi-transparent (T≧10%) or, preferably, transparent (T≧90%). The support can have a thickness of 0.01 to 10 mm, preferably of 0.1 to 5 mm.

The recording layer is preferably arranged between the transparent substrate and the reflecting layer. The thickness of the recording layer is from 10 to 1000 nm, preferably from 50 to 500 nm, particularly preferably about 100 nm, for example from 80 to 150 nm. The absorption of the recording layer is typically from 0.1 to 1.0 at the absorption maximum. With very particular preference, the layer thickness is chosen in a known manner, dependent on the respective refractive indices in the written and the unwritten state at the readout wavelength, such that there is constructive interference in the unwritten state and destructive interference in the written state, or vice versa.

The reflecting layer, whose thickness can be from 10 to 150 nm, preferably has a high reflectivity (R≧70%) coupled with a low transparency (T≦10%).

The layer which is topmost depending on the layer structure, for example the reflection layer or the recording layer, is conveniently additionally provided with a protective layer, which can have a thickness from 0.1 to 1000 $\mu$m, preferably from 0.1 to 50 $\mu$m and, particularly preferably, from 0.5 to 15 $\mu$m. This protective layer may, if desired, also serve as an adhesion promoter for a second substrate layer arranged thereon, which is preferably from 0.1 to 5 mm thick and consists of the same material as the support substrate.

The reflectivity of the total recording medium is preferably at least 60%.

The use of dyes of the formula (I) results in advantageously homogeneous, amorphous and low-scatter recording layers, the refractive index edge of which is, surprisingly, particularly steep even in the solid phase. Further advantages are the high daylight stability coupled with high sensitivity under high-density laser radiation, the uniform written width, and the good thermal stability and storage stability.

Examples of suitable substrates are glasses, minerals, ceramics and thermosets or thermoplastics. Preferred supports are glasses and homo- or copolymeric plastics. Examples of suitable plastics are thermoplastic polycarbonates, polyamides, polyesters, polyacrylates and polymethacrylates, polyurethanes, polyolefins, polyvinyl chloride, polyvinylidene fluoride, polyimides, thermosetting polyesters and epoxy resins. The substrate can be in pure form or else can contain customary additives, for example UV absorbers or dyes, as is proposed, inter alia, in JP 04/167 239 as light protection for the recording layer. In the latter case it may be convenient for the dye added to the support substrate to have an absorption maximum which is hypsochromically shifted by at least 10 nm, preferably by at least 20 nm, relative to the dye of the recording layer.

The substrate is advantageously transparent in at least part of the range from 600 to 700 nm, so that it is permeable to at least 90% of the incident light of the writing or readout wavelength. On the side of the coating the substrate preferably has a spiral guide groove with a groove depth from 50 to 500 nm, a groove width from 0.2 to 0.8 $\mu$m and a spacing between 2 turns from 0.4 to 1.6 $\mu$m, particularly preferably having a groove depth of 100 to 200 nm, a width of 0.3 $\mu$m and a distance between 2 turns from 0.6 to 0.8 $\mu$m.

Instead of the substrate, the recording layer itself can have a guide groove, as is described, inter alia, in EP 392 531.

The recording layer can consist exclusively or essentially of one or more novel oxoporphyrin dyes. To increase the stability still further, however, it is also possible if desired to add known stabilisers in customary amounts, for example a nickel dithiolate described in JP 04/025 493 as light stabiliser. If desired, it is also possible to add additional dyes, although the amount of such dyes is conveniently not more than 50% by weight, preferably not more than 10% by weight, based on the recording layer. Since the recording layer is to consist essentially of a dye of formula (I), it is advantageous for the optionally added dye to have a hypsochromically shifted absorption maximum relative to the dye of the formula (I), and for the amount of the added dye to be kept so small that the proportion of the latter in the overall absorption of the recording layer in the region from 600 to 700 nm is not more than 20%, preferably not more than 10%. With particular preference, however, no additional dye is added.

A particularly suitable reflective material for the reflection layer comprises metals which are good reflectors of the laser radiation used for recording and reproduction, examples being the metals of the third, fourth and fifth main groups and subgroups of the Periodic Table of the chemical elements. Particularly suitable metals are Al, In, Sn, Pb, Sb, Bi, Cu, Ag, Au, Zn, Cd, Hg, Sc, Y, La, Ti, Zr, Hf, V, Nb, Ta, Cr, Mo, W, Fe, Co, Ni, Ru, Rh, Pd, Os, Ir, Pt and the lanthanide metals Ce, Pr, Nd, Pm, Sm, Eu, Gd, Tb, Dy, Ho, Er, Tm, Yb and Lu, and also alloys thereof. For reasons of high reflectivity and ease of preparation, particular preference is given to a reflection layer of aluminium, silver, copper, gold or their alloys.

Suitable materials for the protective layer are predominantly plastics, which are applied in a thin layer either directly or with the aid of adhesion layers to the support or the topmost layer. It is judicious to choose mechanically and thermally stable plastics having good surface properties, which can be additionally modified, for example written on. The plastics can either be thermosets or thermoplastics. Preference is given to radiation-cured (for example using UV radiation) protective layers, which are particularly easy and economic to prepare. Large numbers of radiation-curable materials are known. Examples of radiation-curable monomers and oligomers are acrylates and methacrylates or diols, triols and tetrols, polyimides of aromatic tetracarboxylic acids and aromatic diamines having $C_1$–$C_4$ alkyl groups in at least two positions ortho to the amino groups, and oligomers containing dialkyl groups, for example dimethylmaleimidyl groups.

The novel recording media can also feature additional layers, for example interference layers. It is also possible to construct recording media having a plurality of (for example two) recording layers. The construction and use of such materials are known to the skilled person. If such layers are present, preference is given to interference layers which are disposed between the recording layer and the reflecting layer and/or between the recording layer and the substrate and which consist of a dielectric material, for example as described in EP 353 393 consisting of $TiO_2$, $Si_3N_4$, ZnS or silicone resins.

The novel recording media can be prepared by a technique known per se, it being possible to employ various coating methods depending on the materials used and on their functioning.

Examples of suitable coating methods are dipping, flow coating, spreading, knife coating and spin coating, and also high-vacuum vapour deposition methods. When using flow coating methods, for example, solutions in organic solvents are generally used. When using solvents, care should be taken to ensure that the supports used are insensitive to these solvents. It is a particular advantage of the novel dyes that, in contrast to the dyes used to date, they are well soluble in less polar solvents, making it possible to forego the use of agressive solvents such as acetone. Examples of suitable coating methods and solvents are described in EP 401 791.

The recording layer is preferably applied by spin coating a dye solution, solvents that have been found appropriate being, in particular, alcohols such as 2-methoxy-ethanol, isopropanol, isobutanol or n-butanol or, preferably, fluorinated alcohols such as 2,2,2-trifluoroethanol or 2,2,3,3-tetrafluoro- 1-propanol, and mixtures thereof.

The metallic reflection layer is preferably applied by vapour deposition under vacuum. The material to be applied is first filled into a suitable vessel, which may be equipped with a resistance heating, and is then placed in a vacuum chamber. The support to be treated with vapour is inserted in a holder above the vessel containing the material to be vapour-deposited. This holder is constructed such that the support may be rotated (for example at 50 rpm) and heated. The vacuum chamber is evacuated to about $1.3 \cdot 10^5$ to $1.3 \cdot 10^6$ mbar and the heating is adjusted such that the temperature of the material to be vapour-deposited rises up to its evaporation temperature. The evaporation is continued until the vapour-deposited layer has the desired thickness. Depending on the system structure, the organic recording compound is applied first and then the reflecting layer, or vice versa. The application of a reflecting layer may possibly be forgone.

The sputtering technique is particularly preferred on account of the high degree of adhesion to the support for the application of the metallic reflection layer. The material to be applied (for example aluminium) in the form of a sheet is used as target electrode while the support is fastened to the counterelectrode. First, the vacuum chamber is evacuated to about $10^6$ mbar and then inert gas, e.g. argon, is introduced up to about $10^3$ mbar. A high direct current voltage or radiofrequency voltage of several kV is applied between the target electrode and the counterelectrode, if required using a permament magnet (magnetron sputtering), to create $Ar^+$ plasma. The metal particles sputtered by the $Ar^+$ ions of the target electrode are deposited uniformly and solidly on the support. Coating is carried out over some 10 seconds up to several minutes depending on target materials, sputtering method and sputtering conditions. This technique is described in detail in text books (e.g. J. L. Vossen and W. Kern, "Thin Film Processes", Academic Press, 1978).

The structure of the novel recording medium depends principally on the readout method; known functional principles are the measurement of the change in transmission or, preferably, in reflection.

If the recording material is constructed in accordance with the change in reflection, then the following structures are examples of those which can be employed: transparent support/recording layer (one or more layers)/reflection layer and, if useful, protective layer (not necessarily transparent), or support (not necessarily transparent)/reflection layer/ recording layer and, if useful, transparent protective layer. In the former case the light is irradiated from the support side, while in the latter case the radiation is incident from the side of the recording layer or, if appropriate, from the side of the protective layer. In both cases the light detector is on the same side as the light source. The former construction of the recording material to be used in accordance with the invention is generally preferred.

If the recording material is constructed in accordance with change in light transmission, the following alternative structure is a suitable example: transparent support/recording layer (one or more layers) and, if useful, transparent protective layer. The light for recording and for readout can be irradiated alternatively from the support side or from the side of the recording layer or, if appropriate, from the side of the protective layer, the light detector in this case always being on the opposite side.

Examples of suitable lasers are commercial diode lasers, especially semiconductor diode lasers, for example He/Ne, Kr, GaAsAl, InGaAlP or GaAs laser diodes with a wavelength of 602, 612, 633, 635, 647, 650, 670 or 680 nm, or ion lasers, for example HeCd or Ar laser having a wavelength of 442 or 457 nm, respectively.

Recording can be undertaken point by point with the aid of a light modulator. Preference is given to the use of diode lasers whose radiation is focussed onto the recording layer.

The novel process makes it possible to record information with high reliability and stability, featuring very good mechanical and thermal stability and also high light stability and sharp edge zones. A particular advantage is the surprisingly high signal-to-noise ratio of support material to information marking, which permits faultless readout. The high storage capacity is particularly useful in the video sector.

The readout of the information is carried out by measuring the absorption by the reflection or transmission process using laser radiation, it being particularly advantageous that laser radiation of the wavelength used for recording may be employed, so that no second laser apparatus need be used. In a preferred embodiment of the invention, the information is recorded and readout at the same wavelength. During readout, the capacity of the laser is usually reduced over the laser radiation used for recording, e.g. from ten to fifty times. In the recording material used according to this invention, the information can be readout once or several times. The change in the absorption spectrum or the recorded information can be read with a photodetector using a low-energy laser. Suitable photodetectors include PIN and AV photodiodes as well as microscope spectrophotometers (e.g. ®UMSP80, supplied by Carl Zeiss), which make it possible to measure the spectral changes through transmission or absorption and, in particular, through reflection.

The novel information-containing medium is in particular an optical information material of the WORM type. It can be used, for example, as a playable CD (compact disc), as storage material for computers or as an identity and security card, or for the production of diffractive optical elements such as holograms.

The invention therefore additionally relates to the use of the novel optical recording medium for optical recording, storage and reproduction of information. Recording and reproduction preferably take place in the wavelength range from 400 to 500 nm or, particularly preferably, from 600 to 700 nm.

The following Examples illustrate the invention in more detail:

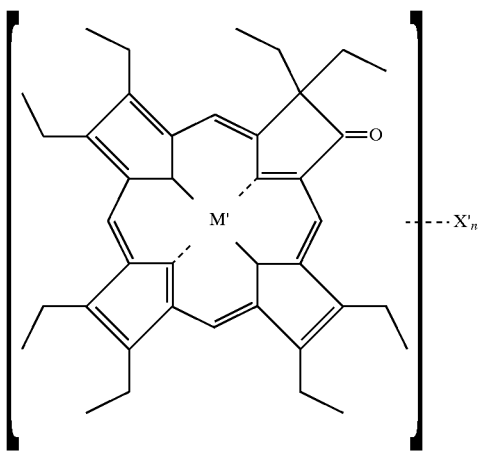

EXAMPLE A1

A 100 ml three-necked flask, equipped with thermometer, stirrer, septum and nitrogen inlet, is charged with 9 mg (12 $\mu$mol) of 2,2,7,8,12,13,17,18-octaethyl-3-oxoplatinum chlorine (formula III, M'=Pt, n=0) in 50 ml of chloroform and this mixture is then cooled to 3° C. A solution of 1.9 mg (24 $\mu$mol) of bromine in 1 ml of chloroform is then added drop-wise over 5 minutes upon which the reaction solution immediately changes colour from purple to blue. After another 5 minutes, 10 ml of acetone are added. The organic phase is washed with 50 ml of water, dried over magnesium sulfate, filtered and concentrated by evaporation.

9 mg of bromated 2,2,7,8,12,13,17,18-octaethyl-3-oxoplatinum chlorine (formula III, M'=Pt, X'=Br) are obtained. According to thin layer chromatography (DC; silica gel, hexane/ethyl acetate 6:1, $R^f$=0.41) the blueish powdery product is uniform.

UV (N-methylpyrrolidone): $\lambda_{max}$=598 nm (starting product: $\lambda_{max}$=589 nm); $^1$H-NMR (CDCl$_3$): 10.02 (s,1H); 9.97 (s,1H); 9.91 (s,1H); 9.21 (s,1H); 4.00–3.80 (m,12H); 2.84–2.75 (m,4H); 1.88–1.76 (m, 18H), 0.46–0.40 (m,6H).

EXAMPLE B1

0.5 % by weight of 2,2,7,8,12,13,17,18-octaethyl-3-oxopalladium chlorine (formula III, M'=Pd, n=0) are dissolved in methylcyclohexane. This solution is then filtered through a teflon filter having a pore width of 0.2 $\mu$m and coated by the spin coating method to the surface of a 1.2 mm thick grooved polycarbonate disc having a diameter of 120 mm at 300 rpm. Excess solution is spun off by increasing the speed of rotation. The solvent is removed by evaporation and the dye remains as a uniform solid layer. After drying, this solid layer has an absorbance of 0.13 at 635 nm. In a vacuum coating apparatus a 100 nm thick aluminium layer is then applied to the recording layer. Subsequently, a 13 $\mu$m thick protective layer consisting of a UV-curable photopolymer (SD-17, Dainippon Ink) is coated thereon by spin coating.

The recording support has a base reflectivity of 60 % at 635 nm. Using a 10 mW laser diode having a wavelength of 635 nm, the active layer is inscribed at an output of 8 mW, each mark receiving an energy of 1.5 nJ/pixel. This procedure brings about a change in reflection from 60% to 30% at inscribed sites. The marks can be readout again at a reduced output.

On a commercially available microscope spectrophotometer (®UMSP, Carl Zeiss & Co.) the change in reflectivity of the marks is measured in the range from 450–550 nm. The reflectivity changes from high to low at a 50 % modulation.

What is claimed is:

1. An optical recording medium comprising a substrate, a reflecting layer and a recording layer, which recording layer consists essentially of one or more than one dye of formula (I) or chlorination or bromation products thereof

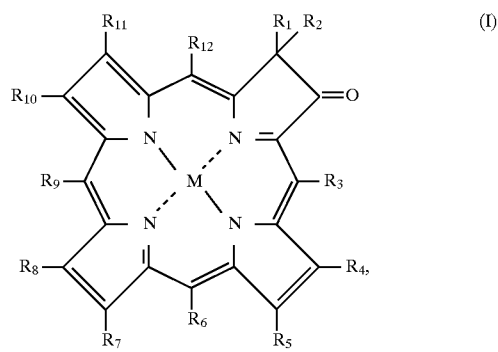

wherein $R_1$ and $R_2$ are each independently of the other $C_1$–$C_8$alkyl or $C_2$–$C_8$alkenyl, each of which is unsubstituted or substituted by $OR_{13}$, $NR_{14}R_{15}$, $COOR_{13}$, $CONR_{14}R_{15}$ or CN;

$R_3$, $R_6$, $R_9$ and $R_{12}$ are each independently of one another hydrogen, halogen, CN, CHO, $C_1$–$C_8$alkyl, or $C_6$–$C_{14}$aryl which is unsubstituted or mono- or polysubstituted by halogen, $NO_2$, $C_1$–$C_8$alkyl, $OR_{13}$, $SR_{13}$, $NR_{14}R_{15}$, $COOR_{13}$, $CONR_{14}R_{15}$ or CN;

$R_4$, $R_5$, $R_7$, $R_8$, $R_{10}$ and $R_{11}$ are each independently of one another hydrogen, halogen, $NO_2$, CHO, $COOR_{13}$, $CONR_{14}R_{15}$, CN, or $C_1$–$C_8$alkyl or $C_2$–$C_8$alkenyl, each of which is unsubstituted or substituted by $OR_{13}$, $NR_{14}R_{15}$, $COOR_{13}$, $CONR_{14}R_{15}$ or CN, or wherein, each independently of one another, one or several pairs $R_4$ and $R_5$, $R_7$ and $R_8$ and/or $R_{10}$ and $R_{11}$, are 1,4-buta-1,3-dienylene which is unsubstituted or mono- or polysubstituted by halogen, $NO_2$, $C_1$–$C_8$alkyl, $OR_{13}$, $SR_{13}$, $NR_{14}R_{15}$, $COOR_{13}$, $CONR_{14}R_{15}$ or CN, or 1,3-propylene, 1,4-butylene or 2-buten-1,4-ylene, each of which is unsubstituted or mono- or polysubstituted by $C_1$–$C_8$alkyl, $OR_{13}$, $NR_{14}R_{15}$, $COOR_{13}$, $CONR_{14}R_{15}$ or CN, such that, optionally together with the shared C—C or C=C group, a five- or six-membered ring is formed;

wherein $R_{13}$, $R_{14}$ and $R_{15}$ are each independently of one another hydrogen, $C_1$–$C_{20}$alkyl, $C_2$–$C_{20}$alkenyl, $C_2$–$C_{20}$alkynyl, $C_6$–$C_{14}$aryl or $C_7$–$C_{18}$aralkyl, or $NR_{14}R_{15}$ is a five- or six-membered heterocycle which may contain a further N or O atom and which can be mono- or polysubstituted by $C_1$–$C_8$alkyl;

and M is $H_2$ or a divalent metal atom, oxometal, halogenometal or hydroxymetal, and wherein the divalent oxometal, halogenometal or hydroxymetal may be additionally coordinated to one, and the divalent metal atom may additionally be coordinated to one or two, neutral molecules which are independent or dependent on each other and which contain at least one hetero atom selected from the group consisting of N, O and S.

2. A recording medium according to claim 1, wherein $R_1$ and $R_2$ are each independently of the other $C_1$–$C_8$alkyl which is unsubstituted or substituted by $COOR_{13}$, $CONR_{14}R_{15}$ or CN.

3. A recording medium according to claim 1, wherein $R_3$, $R_6$, $R_9$ and $R_{12}$ are each independently of one another hydrogen, halogen, CN, CHO, $C_1$–$C_8$alkyl, or phenyl which is unsubstituted or substituted by halogen, $NO_2$, $C_1$–$C_8$alkyl, $OR_{13}$, $SR_{13}$ or $COOR_{13}$.

4. A recording medium according to claim 1, wherein $R_4$, $R_5$, $R_7$, $R_8$, $R_{10}$ and $R_{11}$ are each independently of one another hydrogen or $C_1$–$C_8$alkyl.

5. A recording medium according to claim 1, wherein M is $H_2$, Cu(II), Zn(II), Ni(II), Pd(II), Pt(II), Mn(II) or Co(II).

6. A recording medium according to claim 1, wherein $R_1$ and $R_2$ are each independently of the other methyl or ethyl; $R_3$, $R_6$, $R_9$ and $R_{12}$ are hydrogen; $R_4$, $R_5$, $R_7$, $R_8$, $R_{10}$ and $R_{11}$ are each independently of one another straight-chain $C_1$–$C_6$alkyl which is unsubstituted or substituted in ω-position by COOH or $COOC_1$–$C_{20}$alkyl, in particular $(CH_2)_2COOC_1$–$C_{20}$alkyl, and M is $H_2$, Pt or Pd.

7. A recording medium according to claim 1, wherein the compound of formula (I) is a compound of formula (II),

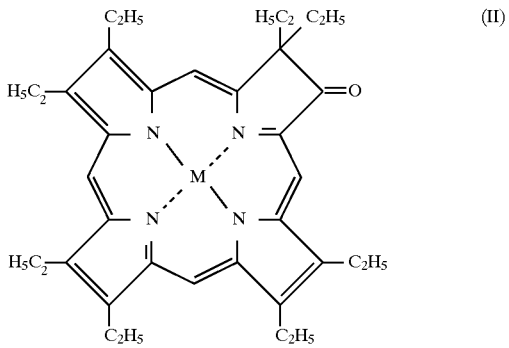

(II)

or a bromation product thereof which contains two or four bromine atoms.

8. A recording medium according to claim 1, wherein the dye has a refractive index of more than 1.8 in the range of from 400 to 500 nm and of from 600 to 700 nm.

9. A recording medium according to claim 1, wherein the substrate has a transparency of at least 90% and a thickness of from 0.01 to 10 mm.

10. A recording medium according to claim 1, wherein the reflecting layer consists of aluminium, silver, copper, gold or their alloys and has a reflectivity of at least 70% and a thickness of 10 to 150 nm.

11. A recording medium according to claim 1, wherein the recording layer is arranged between the transparent substrate, and the reflecting layer and has a thickness of from 10 to 1000 nm.

12. A recording medium according to claim 11, wherein the recording layer has a thickness of from 80 to 150 nm.

13. A recording medium according to claim 1, which is additionally provided with a protective layer which has a thickness of from 0.1 to 1000 μm and whereon a second substrate layer may be applied which is from 0.1 to 5 mm thick and which consists of the same material as the support substrate.

14. A recording medium according to claim 13, which is additionally provided with a protective layer which has a thickness of from 0.5 to 15 μm.

15. A recording medium according to claim 1, which has a reflectivity of at least 60%.

16. A recording medium according to claim 1, wherein at least one interference layer consisting of a dielectric material is additionally disposed between the recording layer and the reflecting layer and/or between the recording layer and the substrate.

17. A method of optical recording, storage and reproduction of information, which comprises writing information on the recording layer of a recording medium comprising a substrate, a reflecting layer and a recording layer as claimed in claim 1 with a laser having a wavelength of from 600 to 700 nm.

18. A method according to claim 17, wherein reproduction is carried out in the wavelength range of from 400 to 500 nm or of from 600 to 700 nm.

* * * * *